Patented Sept. 28, 1943

2,330,227

UNITED STATES PATENT OFFICE 2,330,227

PARASITICIDAL COMPOSITION AND
METHOD OF PREPARATION

George E. Lynn, Midland, Mich., assignor to The
Dow Chemical Company, Midland, Mich., a corporation of Michigan No Drawing. Application May 29, 1941,
Serial No. 395,838

6 Claims. (Cl. 167—42)

The present invention is concerned with parasiticidal materials, and is particularly directed to a method of making a parasiticidal composition comprising a solid water-repellent organic toxicant in intimate association with a finely-divided solid carrier.

Mixtures of organic parasiticidal toxicants with finely-divided solid carriers are not new. Such compositions are generally of either the mechanical mix or solvent impregnation type and are subject to certain disadvantages both in use and preparation.

In preparing mechanical mixtures, great difficulty is frequently encountered in obtaining a homogeneous product. This is occasioned by the tendency of many toxicants and carriers to ball up on grinding or mixing or to form agglomerates and also by differences in the density of the toxicant and carrier whereby the finely ground mixture tends to stratify. The mechanical mixes are not entirely satisfactory for use in spray compositions in that no bond exists between the particles of carrier and toxicant. When such product is contacted with water, there is frequently a separation whereby the toxicant fails to wet and floats upon the surface of the mixture. Also it has been found that relatively large amounts of wetting and dispersing agents and detergents are required to accomplish a satisfactory dispersion of mechanical mixes in water. When mechanical mixes are employed in high velocity dusting apparatus, differences in density result in a separation of the toxicant and carrier through air-floatation whereby deposits obtained on dusted plant surfaces vary appreciably with respect to toxicant content and effectiveness.

In preparing compositions by impregnation of the carrier with a solution of the toxicant in organic solvent, cost, problems of solvent recovery, and explosion and health hazards are of primary consideration. Furthermore, in accordance with such procedure a product is obtained in which the toxicant is largely deposited in and through the pores and interstices of the carrier particle whereby it is given up gradually over a considerable period of time. While this is sometimes advantageous, in many instances it is desirable that the full force of the toxicant be immediately available for the quick control of the plant parasite concerned.

According to the present invention, improved spray-concentrate and dust compositions are obtained by bonding solid water-repellent organic parasiticides to the surfaces of solid carrier particles. This is accomplished by providing a dispersion of a solid carrier and suitable toxicant, both in finely-divided form, in a dilute oil-in-water emulsion and thereafter breaking the emulsion. The liberated oil droplets bond the toxicant particles to the surfaces of the carrier particles in such fashion that when the product is separated, dried, and thereafter employed in either spray compositions or as a dust there is no stratification or separation of the toxicant from the carrier. Furthermore, relatively small amounts of wetting and dispersing agents and detergents are sufficient to accomplish the wetting and deflocculation of the resulting product since the carrier particles to which the toxicant is bonded generally do not have water-repellent characteristics and serve as a vehicle to carry the product into water dispersion.

The process of the invention is directed to accomplishing the adhesion of the toxicant to the carrier surface and not to the impregnation of the carrier or the absorption of the toxicant thereby. In the product so obtained the total toxicant is readily available rather than mechanically or chemically held so as to be given up over a considerable period of time. The method is particularly applicable to the processing of solid organic toxicants which are difficultly soluble in both water and the oil employed.

In carrying out the invention the finely-divided toxicant and carrier may be dispersed in a previously prepared dilute oil-in-water emulsion. Similarly toxicant, carrier, and emulsion forming ingredients may all be stirred and mixed together with the desired amount of water. An alternate procedure comprises adding the oil-in-water emulsion to an aqueous dispersion of the toxicant and carrier.

The exact amount of oil employed is dependen upon the nature of oil and of the carrier, bu should not exceed about 10 per cent by weigh of the combined weights of toxicant and carrie and is preferably below 4 per cent by weight The minimum amount of oil required in th aqueous dispersion may be defined as tha amount sufficient to accomplish the bonding ac tion of the toxicant to the carrier and varies wit the density and fluidity of the particular oil se lected and the density and porosity of the car rier.

While any suitable method of breaking the oil in-water emulsion may be employed, this ste is preferably accomplished by chemical mean through the addition of an inorganic acid, bas or salt to the dispersion mixture. The exac material used and the amount thereof required are largely controlled by the nature of the emulsifying agent employed in preparation of the oil-in-water emulsion. Representative materials which may be employed to liberate the oil include lime, calcium chloride, sodium sulfate, potassium acid sulfate, ammonium sulfate, magnesium chloride, barium chloride, sodium chloride, hydrochloric acid, sulfuric acid, sodium hydroxide, and the like.

Among the emulsifying, detergent, and wetting agents that may be employed both in the preparation of the initial oil-in-water emulsion and in the modification of the separated parasiticide product are glyceryl esters, alkali metal caseinates, metal salts of naphthenic acid, alkali metal salts of sulfonated aromatic hydrocarbons and phenols, partially neutralized sulfuric acid derivatives of fatty acids and their esters, water-soluble soaps, blood albumen, hydrophylic colloids, hydroxy-alkyl ethers of phenols, and the like. Any relatively non-volatile oily material compatible with the toxicant and non-injurious to growing vegetation and higher animals in the amounts employed is suitable in the preparation of the initial oil emulsion. Representative materials include petroleum, vegetable, fish, and animal oils, and synthetic organic products such as mono- and poly-olefine oils, liquid alkylated or halogenated diphenyls or diphenyl oxides, higher esters and ethers whether aliphatic or aromatic in nature, etc.

The following examples are illustrative but are not to be construed as limiting the invention.

Example 1

187 grams of finely-divided dicyclohexyl amine salt of 2.4-dinitro-6-cyclohexyl-phenol and 748.5 grams of diatomaceous earth were suspended in 2,244 milliliters of water with stirring. An oil-in-water emulsion consisting of 17 grams of sodium oleate and 18.7 grams of linseed oil in 1000 milliliters of water was stirred into the aqueous suspension of toxicant and carrier. 23.33 grams of aqueous 15 per cent by weight calcium chloride was then stirred portionwise over a period of 10 minutes into the mixture whereby the sodium oleate reacted to form calcium oleate, the oil-in-water emulsion was broken, and the linseed oil liberated. Agitation was continued for a short time and the mixture filtered. The aqueous filtrate was oil free. The residue from the filtration was air dried and milled with 37.2 grams of sodium lauryl sulfate to obtain a dust product having the following approximate percentage composition by weight:

| | Per cent |
|---|---|
| Dicyclohexyl amine salt of 2.4-dinitro-6-cyclohexyl-phenol | 18.5 |
| Diatomaceous earth | 74.2 |
| Sodium lauryl sulfate | 3.7 |
| Linseed oil | 1.9 |
| Calcium oleate | 1.7 |
| | 100.0 |

This product was adapted to be employed as a spray concentrate for the production of aqueousous compositions valuable in the control of many agricultural parasites. In representative applications, 2.5 pounds of the product dispersed in 100 gallons of water gave 100 per cent kill of red spider on beans, 1.3 pounds per 100 gallons gave 97.6 per cent kill, and 0.65 pound per 100 gallons gave 96.7 per cent kill. The dried product dispersed readily in water, and the toxicant showed no tendency to separate from the carrier in the aqueous composition. A portion of the dried product was stored for a considerable period of time without any indication of separation of the toxicant from the carrier or tendency toward agglomeration of the particles.

Example 2

An oil-in-water emulsion consisting of 0.5 gram of sodium oleate, 1 gram of linseed oil, and approximately 50 milliliters of water was stirred into an aqueous dispersion of 2 grams of finely-divided dicyclohexyl amine salt of 2.4-dinitro-6-cyclohexyl-phenol and 8 grams of diatomaceous earth in 25 grams of water. 1 milliliter of 15 per cent by weight calcium chloride solution in water was added and stirred dropwise into the mixture, after which the suspension was filtered and dried. The filtrate contained no oil. The dried cake was ground with 0.5 gram of sodium lauryl sulfate to obtain a parasiticidal concentrate in dust form having the following approximate percentage composition by weight:

| | Per cent |
|---|---|
| Calcium oleate | 2.1 |
| Linseed oil | 8.5 |
| Sodium lauryl sulfate | 4.2 |
| Dicyclohexyl amine salt of 2.4-dinitro-6-cyclohexyl-phenol | 17.0 |
| Diatomaceous earth | 68.2 |
| | 100.0 |

Example 3

In a further modification of the invention, the toxicant and carrier may be dispersed in the water of a spray tank and the oil emulsion and sufficient of a suitable electrolyte to break the said emulsion successively added thereto with stirring. The resulting composition may be applied directly for the control of plant parasites without going through the steps of separating and drying the toxicant-oil-carrier product.

In an alternate procedure, the carrier and toxicant may be dispersed in a previously prepared dilute oil emulsion, the mixture treated to break the emulsion and deposit the oil, and the resulting aqueous mixture employed substantially as described in any of Examples 1, 2, or 3 above. If preferred, however, the product as separated from the aqueous dispersion may be stored in paste form and thereafter utilized as required with or without the addition of wetting or dispersing agents.

Other water, repellent and insoluble solid organic toxicants which may be compounded as described above to form desirable parasiticidal compositions include 2.4-dinitro-6-cyclohexyl-phenol, 2.4-dinitro-6-methyl-phenol, 2.4-dinitro-6-n-octyl-phenol, 2-hydroxy-diphenyl, 2.3.4.6-tetrachloro-phenol, pentachloro-phenol, the solid water-repellent metal and amine salts of any of the foregoing, phenotiazine, phenothioxin, solid polyhalobenzenes, rotenone, ground derris root, and the like. Instead of diatomaceous earth as set forth in the examples, any other finely-divided inert solid which is insoluble in water and compatible with the particular toxicant and oil selected may be employed. Materials which are suitable for such use include bentonite, talc, chalk, gypsum, fuller's earth, cryolite, volcanic ash, lignocellulosic flour such as walnut shell flour and redwood flour, and finely-divided carbon.

I claim:

1. A method for bonding solid water-repellent organic parasiticidal toxicants to finely-divided carriers comprising the steps of preparing a dispersion of the carrier and finely-divided toxicant in a dilute oil-in-water emulsion, and thereafter breaking the emulsion.

2. A method for bonding solid water-repellent organic parasiticidal toxicants to finely-divided carriers comprising the steps of preparing a dispersion of the carrier and finely-divided toxicant in an oil-in-water emulsion comprising an amount of oil not in excess of 10 per cent by weight of the combined weights of carrier and toxicant, and breaking the emulsion.

3. A method for bonding solid water-repellent organic parasiticidal toxicants to diatomaceous earth comprising the steps of preparing a dispersion of diatomaceous earth and finely-divided toxicant in a linseed oil-in-water emulsion comprising an amount of oil not in excess of 4 per cent by weight of the combined weights of diatomaceous earth and toxicant, and breaking the emulsion.

4. A method for bonding solid water-repellent organic parasiticidal toxicants to finely-divided carriers comprising the steps of dispersing the finely-divided toxicant and carrier in water, mixing with the dispersion an amount of oil-in-water emulsion sufficient that the oil represents not more than 10 per cent by weight of the combined weights of toxicant and carrier, and breaking the dilute oil-in-water emulsion to liberate the oil.

5. A method for bonding solid water-repellent organic parasiticidal toxicants to diatomaceous earth comprising the steps of dispersing the finely-divided toxicant and diatomaceous earth in water, mixing with the dispersion an amount of a linseed oil-in-water emulsion sufficient that the oil represents not more than 4 per cent by weight of the combined weights of toxicant and diatomaceous earth, and breaking the dilute oil-in-water emulsion to liberate the linseed oil.

6. In the preparation of agricultural parasiticides the steps of dispersing a solid water-repellent organic toxicant and carrier, both in finely-divided form in water, mixing with the dispersion an amount of an oil-in-water emulsion sufficient that the oil represents not more than 4 per cent by weight of the combined weights of toxicant and carrier, breaking the oil-in-water emulsion to liberate the oil, separating the water immiscible constituents of the mixture, drying the residue so obtained, and incorporating additional wetting and detergent agents with the dried residue.

GEORGE E. LYNN.